May 9, 1967 D. E. GOSLEE ET AL 3,318,695
METHOD OF PRODUCING NUCLEAR FUEL ELEMENTS OF
STAINLESS STEEL COATED UO₂ PARTICLES
Filed May 24, 1963 3 Sheets-Sheet 1

INVENTORS
DAVID E. GOSLEE
LOUIS FRANK
BY

United States Patent Office 3,318,695
Patented May 9, 1967

3,318,695
METHOD OF PRODUCING NUCLEAR FUEL ELEMENTS OF STAINLESS STEEL COATED $UO_2$ PARTICLES
David E. Goslee, White Marsh, and Louis Frank, Baltimore, Md., assignors, by mesne assignments, to the United States of America as represented by the United States Atomic Energy Commission
Filed May 24, 1963, Ser. No. 283,126
3 Claims. (Cl. 75—206)

ABSTRACT OF THE DISCLOSURE

A process for directly forming fissile $UO_2$ particles into into a tubular shaped high density dispersion having a retaining matrix in which stainless steel coated, spherical, $UO_2$ particles are extruded at low temperature with a binder directly to form a tube, the binder is removed, and a stainless steel cladding is intimately bonded to the tube by hot isostatic pressing.

This invention relates to fuel elements for nuclear reactors and to a method of making fuel elements for nuclear reactors.

This invention was made in the course of, or under, a contract with the United States Atomic Energy Commission.

In nuclear reactors, tubular fuel elements with a dispersion of separate and discrete $UO_2$ fuel particles in a stainless steel restraining matrix have been a proven and reliable fuel form. The tubular shape has had great flexibility strength and advantageous thermal characteristics; the $UO_2$ has had a high melting point, high density, and has been a stable, uranium chemical form; and the stainless steel matrix has provided metallurgical stability, corrosion resistance, unreactivity with $UO_2$ fuel particles, and inherent strength at high operating temperatures and neutron fluxes. Additionally, the properties of stainless steel have made it potentially desirable as a matrix material in providing high fuel loadings and high fuel burn-ups in portable reactors where these features can result in substantial weight savings.

The principal system for providing these fuel elements has been the powder metallurgy system. In accordance with the powder metallurgy system of U.S. Patent 3,015,-615, finely divided $UO_2$ fuel particles have been mixed with finely divided stainless steel matrix metal and this mixture has been cold-rolled into a flat cermet strip which has been sintered, cold-rolled and mechanically bent on mandrels or the like into a tubular-shaped cermet core. This system has provided an intimate and tenacious bond between the fuel and matrix. It has, however, been difficult or impossible to obtain very small finely divided particles of uniform size and shape and thus the distribution or final particle size has not been uniform. Also, the prefabrication of the cermet strip and the other heavy cold working steps required for forming the tubular shape have been expensive and time consuming, and have led to difficulties in repeatedly obtaining a uniform dispersion of the fuel in the matrix because there have been large reductions in cermet thickness with large directional working to achieve a reasonable density. Additionally, the high forming force has resulted in fabrication damage to the fuel during the rolling or other fabrication steps. Such damage has principally included agglomeration, fuel fracture and fuel stringering and has resulted in insufficient matrix restraining capability, undue local yielding, joining of particle cavities, formation of larger pressure cells, or premature failure by blister, or crack propagation to the fuel element surface which has limited fuel loadings and burn-up to low levels.

It is an object of this invention, therefore, intimately, tenaciously and uniformly to join and disperse $UO_2$ nuclear fuel particles with a stainless steel matrix.

It is another object of this invention to provide an improved process for fabricating tubular fuel elements having uniformly dispersed $UO_2$ nuclear fuel particles in a stainless steel matrix.

In is another object of this invention to minimize fuel fabrication damage in $UO_2$-stainless steel tubular-shaped dispersions.

It is another object of this invention to provide high fuel loadings and high fuel burn-up in a fuel element having $UO_2$ fuel dispersed in a stainless steel matrix.

It is another object of this invention to provide a nuclear fuel element with $UO_2$ cermet fuel particles encased in a uniform thickness deformation restraining stainless steel matrix having a stainless steel cladding.

It is also an object of this invention to provide a novel composition for forming $UO_2$-stainless steel nuclear fuel element dispersions that can be extruded directly into tubular shapes with a uniform fuel particle dispersion therein.

According to this invention the forming of a nuclear fuel element tube comprises extruding a slurry of spherical, stainless steel coated fuel particles with a volatile binder directly to form a tube at low temperature. Volatilization of the binder, swage compaction and hot isostatic pressing then effects final densification and diffusion bonding of the fuel coatings. More particularly, in one embodiment, the process of this invention contemplates extruding a slurry of spherical $UO_2$ particles having a stainless steel coating, and a rubbery-elastic binder into a semi-self-sustaining tubular core, removing the binder at high temperature by volatilization while initiating diffusion bonding of the particle coatings, swaging the core for densification and to straighten the core, adding dead end sections and tubular stainless steel cladding, sealing this cladding and isostatically pressing the assembly at elevated temperatures to effect final diffusion bonding of the core and clad and final densification under pressure at high temperature. In this manner the tubular product is formed efficiently at a reasonable cost, the matrix is bonded around the fuel uniformly, intimately and tenaciously, the fabrication steps combine to minimize or avoid changes in design and material properties as well as fuel fabrication damage, and a fuel element having uniformly dispersed $UO_2$ particles in a stainless steel matrix and cladding is provided. Moreover, with the proper selection of materials as hereinafter more particularly pointed out, it is possible to obtain the uniform dispersion desired initially and to maintain this dispersion throughout the fabrication steps necessary for forming high fuel loadings and high fuel burn-up in a safe, long operating life fuel element for nuclear reactors.

Various other objects and advantages will appear from the following description of one embodiment of this invention, and the novel features will be particularly pointed out hereinafter in connection with the appended claims.

The fuel element of this invention may be better understood by reference to the accompanying figures in which.

Figure 5:
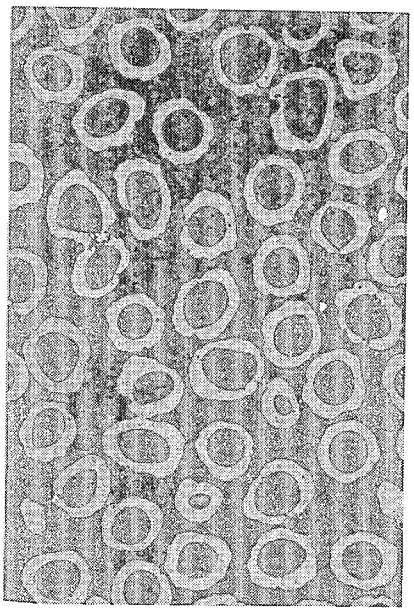
Figure 7:
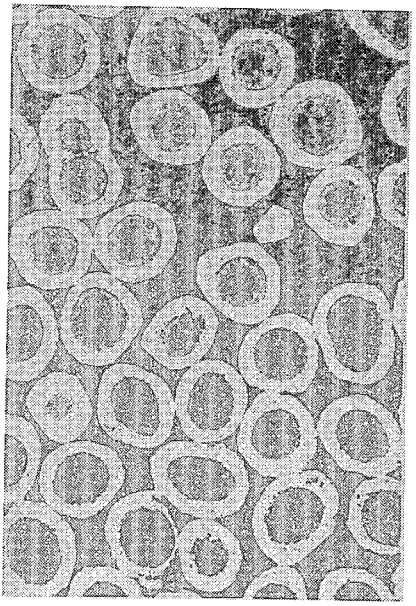
Figure 4:
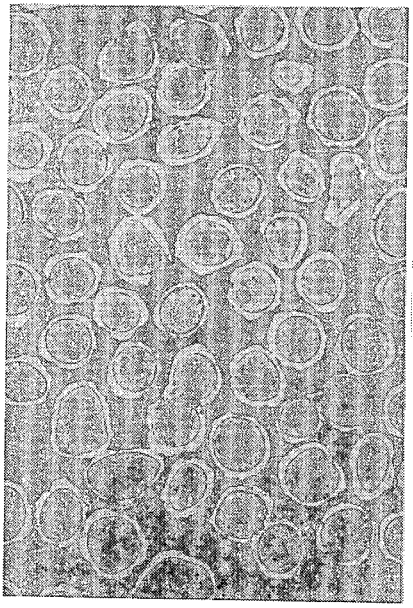
FIG. 4 is a photomacrograph of a polished section at a magnification of 75× showing spherical $UO_2$ of −100 to +140 mesh size, coated with a stainless steel layer of about 27 micron thickness and a 78 weight percent coating increase and which are suitable for the process of this invention.
Figure 6:
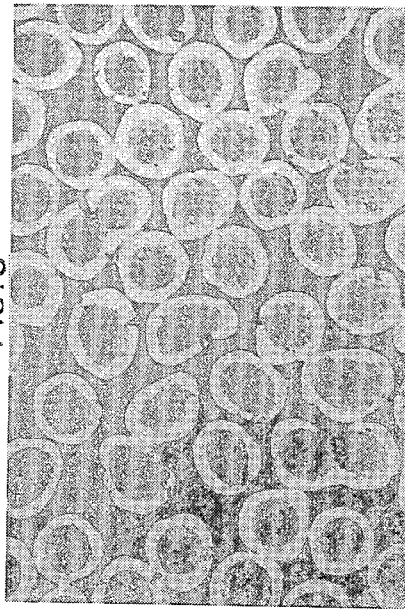

FIG. 5 corresponds to the photomacrograph of FIG. 4 with a 123 weight percent coating increase;

FIG. 6 corresponds to the photomacrograph of FIG. 4 with a 174 weight percent coating increase:

FIG. 7 corresponds to the photomacrograph of FIG. 4 with a 266 weight percent coating increase.

Figure 1:
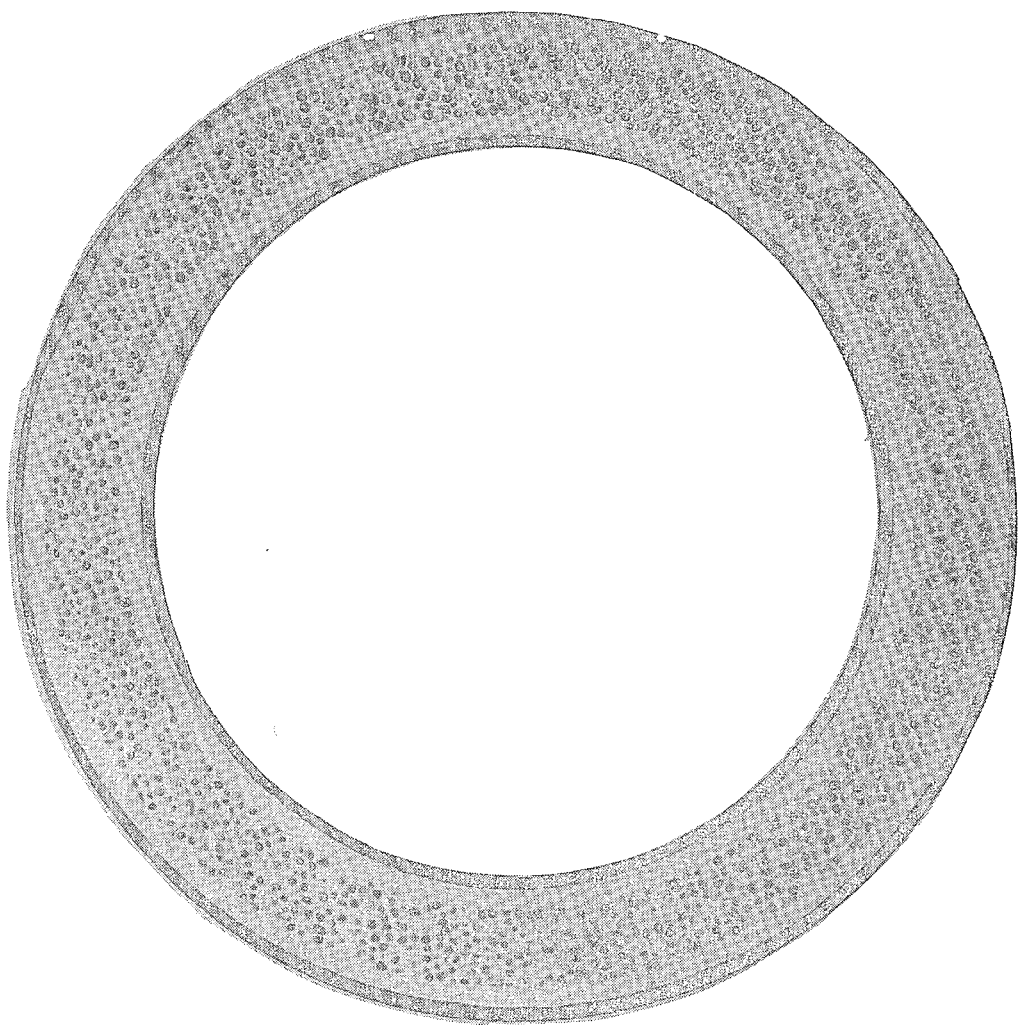
FIG. 1 is a partial cross-section, transverse to the axis of the tubular fuel element of this invention.

Referring to FIG. 1, a tubular fuel element is shown which is suitable for use in a nuclear reactor such as described in U.S. patent application Serial No. 684,501, filed September 17, 1957, now abandoned.. Considering one of the uranium dioxide fuel particles, shown as dark circular portions, and its surrounding stainless steel matrix, shown as the lighter surrounding portion, the matrix acts as a pressure vessel restraining the fission products and forces produced within. The individual fuel element consists of many of these vessels or cells forming a cermet core complete with protective interconnecting dead ends and tubular stainless steel cladding shown as the light inner and outer portions free of fuel particles.

In preparing $UO_2$ for use in accordance with this invention, it is first necessary to provide conventional ceramic grade $UO_2$ in the form of a smooth pebble-shaped or spheroidal particle. Advantageously these particles are uniformly sized $-100$ to $+140$ mesh particles such as are commercially available and the preparation of the spherical $UO_2$ particles may follow the standard ceramic techniques practiced in most ceramic laboratories. These particles may be produced, for example, as described in copending application Ser. No. 27,227 filed by Francis M. Cain, Jr., et al., now U.S. Patent 3,088,892. These particles are then coated with a uniform coating of stainless steel between 20 to 50 microns based on fuel loadings from 30 to 50 w/o $UO_2$. The stainless steel may be high strength, ductile 17.5 to 12.5 austenitic stainless steel.

The coating of the $UO_2$ spherical particles with stainless steel must be continuous and to this end may follow standard metallurgical coating techniques followed in most metallurgical and ceramic laboratories. Such systems for applying the coating to the particles comprise the well-known electroplating, electroless plating, vapor plating and the hydrogen reduction of oxides such as have been described, for example, in U.S. Patent 2,969,309 and the paper entitled "Coated Fuel Particles" by F. M. Cain, B. L. Vondora and F. Forscher presented at the IAEA symposium in Vienna, Austria, on May 10–13, 1960. The application and reduction of metal oxides coated on the $UO_2$ particles also may employ a volatile organic binder such as described hereinafter and a standard stainless steel powder, comprising, for example, 74 w/o $Fe_2O_3$, 18 w/o $Cr_2O_3$ and 8 w/o $NiO$. Suitable stainless steel coated $UO_2$ particles having such a coating which has been reduced at high temperature, are shown in FIGURES 4–7. These coated particles have from about 78 w/o increase in coating to about 266 w/o increase in coating, and a coating thickness from about 20 to 50 microns.

A suitable volatilely removable, rubbery binder for the slurry extrusion of the spherical, stainless steel coated $UO_2$ particles comprises a viscous slurry of starch, such as Steratex brand starch. Other starch binders comprise methyl-cellulose starch, straight starch and Methycel and Ceramel C brand starches or combinations of these. An additional advantageous volatilely removable, rubbery binder comprises polyvinyl alcohol alone or in combination with the above mentioned starches. A still further advantageous volatilely removable, rubbery binder alone or with the above-mentioned binders, has been an Indian guar tree gum which is a well-known hydrophilic colloid for use as a humectant suspending agent. A suitable combination of the latter has been provided by a slurry of Jaguar brand guar gum compound made by Stein-Hall & Company comprising methyl cellulose starch and guar gum. These above-mentioned organic binders have been advantageous because they have been found to provide small shrinkage, to be cheap, to have an easily adjustable viscosity with water, and easily and completely to volatilize without decomposing into carbon residues in the extrusion. As described in more detail hereinafter, the proper proportion of binder water and coated particles is important in providing the advantages of this invention such as preventing fabrication damage and obtaining uniform dispersion during and after the extrusion step.

The cold binder extrusion process of this invention comprises directly extruding the tubular configuration while effecting minimum change in the shape, integrity and distribution of the stainless steel coated $UO_2$ fuel. A series of experiments was run in which the ratio of binder weights to extrusion solids weight content was varied from 0.028 to 0.060, and the ratio of water weight to solid weight was varied from 0.14 to 0.28. The best particle extrusion was found at a binder-to-solid ratio of 0.48 and a water-to-solid ratio of 0.24. This results in an extrusion composition of 81.2 w/o solids, 3.8 w/o binder, 15 w/o water and an extrusion which has the proper particle separation, the required low fuel damage and a high green strength for further fabrication.

The drying process which follows involves removing the binder from the extrusion product. The water is first removed by blowing heated air over the extrusion piece for a period of 8 to 24 hours. This removal of the water can also be accomplished in less time in a vacuum at low vacuums. The remaining binder is then removed at high temperatures, after the extrusion is dry by volatilization in a pre-heated furnace. After investigating a number of sequences, it was found possible to stroke the specimen directly into the hot zone of the furnace at up to 1300° C. At this temperature the binder is removed quickly, and no distortion of the porous extrusion was encountered. This also results in a hardened extrusion piece which can be handled roughly without breaking apart. When the binder is removed in the pure, dry, hydrogen atmosphere at 1300° C., complete reduction of the stainless steel coating on the $UO_2$ is also assured.

The swage compaction steps which come next straighten and pre-densify the extrusion prior to isostatic pressing. In this operation, the as-hardened density of about 50% is increased to the 65% to 85% density range.

Suitable dead-ends are fabricated from wrought, powder-metal, as extruded or swaged stainless steel stock and no welds or unions are made between the cermet core and the dead-ends. Advantageously, the ends of the stainless steel clad and dead-ends are machined to corresponding angles for good mechanical contact.

The cladding for the tubes is advantageously selected from available stainless steel tubing stock with from 0.008 to 0.018 inch wall thicknesses. Separate cladding is placed on the inside and on the outside of the cermet core. These components are all then assembled together with dead-ends between the claddings over a mandrel and all the respective mating surfaces are gently drawn down in a suitable small reduction size die into intimate contact with each other. Then the components may be heat-treated at temperatures sufficient to initiate diffusion bonding of these respective contacting surfaces. This temperature, for example, is up to about 1300° C.

Prior to isostatic pressing, the cladding tubes must be evacuated and welded to seal them circumferentially with their dead-ends at each end to prevent gas leakage into the center of the tube wall. Suitable welding for this purpose is welding between the cladding and the dead-ends, even for low density extrusion-type dead ends.

Isostatic pressing has the advantage of completing the densification to the desired high level with multidirectional forces that do not damage the described $UO_2$ fuel distribution that has been maintained through the described extrusion and swaging steps. To this end the sealed assembly is subjected to hot isostatic pressing in an inert gas such as helium at about 2150° F. and about 10,000 p.s.i. for about three hours.

Figure 2:
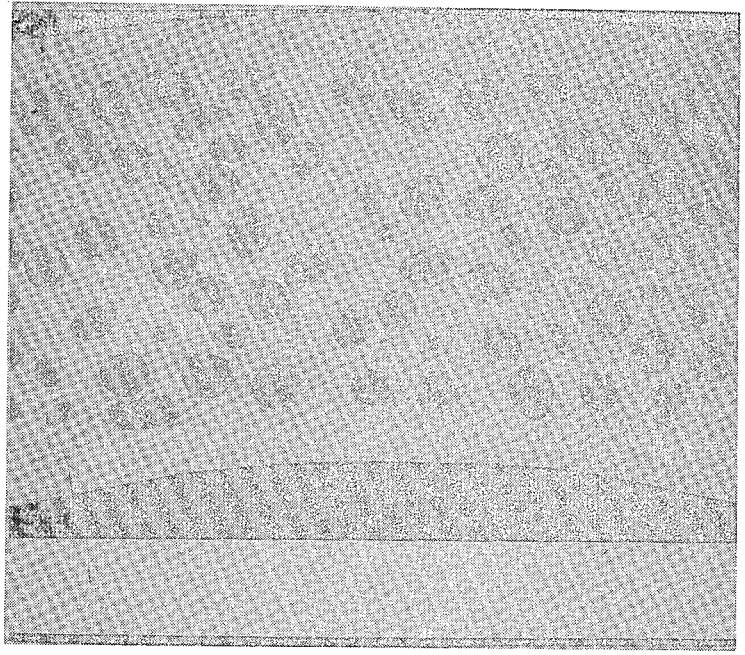
FIG. 2 is a partial transverse cross-section through the fuel element of FIG. 1.
Figure 3:
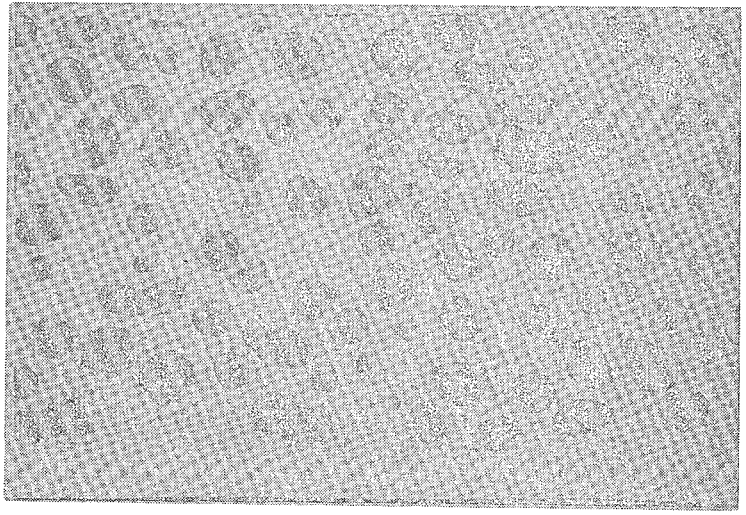
FIG. 3 is a partial longitudinal cross-section through the fuel element of FIG. 1.

By using stainless steel coated spherical $UO_2$ particles in the extrusion-swaging-isostatic pressing fabrication process of this invention, the advantage of a directly formed tubular product may be realized along with the multidirectional forces of isostatic pressing at high temperatures, to yield a cermet structure of ideal, or near ideal, $UO_2$ particled distribution in stainless steel with minimum fracture, stringering and distortion of the fuel particles. Also, the fuel element produced contains high fuel loadings in a thick cermet meat with high fuel burning capability for long reactor life. To this end the fuel elements of this invention have 30 to 50 w/o $UO_2$ loadings in an 0.030 to 0.150 inch thick meat, capable of 60 to 90 a/o $U^{235}$ burnup and 60 to 100 megawatt year life as compared to previous tubular elements with 20 to 35 w/o $UO_2$ loadings in a 0.025 to 0.035 inch thick meat, capable of 30 to 45 a/o $U^{235}$ burnup and a 15 to 30 megawatt year life. These fuel elements are shown in FIGURES 1-3. In FIGURES 2 and 3, originally photographed at 60×, FIG. 2 is a transverse section and FIG. 3 is a longitudinal section of the fuel element of this invention with 39 w/o of −100 to 140 mesh $UO_2$ particles in a single, uniformly, homogeneous, deformation restraining matrix.

In one embodiment, the process of this invention for producing the described fuel element is illustrated by the following example:

EXAMPLE

Spherical $UO_2$ of −100+140 mesh size, coated with a stainless steel layer of about 27 microns thickness was used. The coated particles were about 39 w/o $UO_2$ composition at this point. The extrusion components were then weighed out as: 80.9 w/o coated $UO_2$, 3.9 w/o binder, and 15.2 w/o distilled water. The solid binder and stainless steel coated $UO_2$ particles were mixed in a planetary blender until well dispersed, for about 5 minutes per 500 grams. The distilled water was added during 15 minutes while the blending continued to form a thick rubbery elastic mixture. The mixture was let stand one-half hour prior to extrusion.

The mixture was then extruded under relatively low pressure, under about one ton/in.$^2$, from a suitable die (not shown) to form a longitudinally extending, semi-self-sustaining, rubbery tubular shaped element. This rubbery tubular extrusion as well as other like extrusions were collected on a V-shaped, perforated rack and were dried in still room air for 24 hours, in forced hot air for 18 hours or under vacuum for 10 hours to remove the water. During this period the extrusion O.D. shrunk about 3.8% with, however, little change in wall thickness.

Then the extrusions were heat treated in pure, dry hydrogen at about 1100° C.–1150° C. for one hour and for three hours in pure, dry hydrogen at 1300° C. to remove the binder and to initiate diffusion bonding of the coated particles together.

The next series of steps effected straightening and densification by cold swaging reduction of the wall thickness. To this end the tube was fitted with a hardened steel mandrel and was swaged for one to six passes taking about 10% reduction in tube wall thickness per pass. Intermediate one hour heat treatments in dry hydrogen at 1300° C. were given between each swaging pass. By varying the number of steps the density of the tubular extrusions may be varied between 50% of the finally desired density, in the unstraightened condition, to 85% after six passes. The total reduction after six swaging passes was 38% on the tube diameter and 55% on the tube wall thickness yielding and 85% dense product. A final heat treatment for one hour in dry hydrogen at 1300° C. was given to anneal the predensified tube.

In the next series of operations the cermet tube was assembled with its dead-ends and cladding into a fuel element preparatory to isostatic pressing. The tubular extrusion, suitable wrought stainless steel dead-ends and stainless steel cladding were also machined to size. Then the components were assembled by (1) fitting a dead-end, the cermet tube and another dead-end over the longitudinal axis of an inner cladding tube, and (2) fitting the outer cladding tube over one dead-end, the cermet tube and the other dead-end. A hardened mandrel was used for alignment.

The assembly was then drawn through a die, using the hardened mandrel, until the components were in contact on the diameter axis. The whole assembly was then placed in an electron beam welding chamber and evacuated to remove air within the assembly. Each end of the tubular assembly was then electron beam welded thus joining the inner clad, dead-end, and outer clad wall thickness to seal the tube under vacuum.

The sealed assembly was then isostatically pressed at 2150° F. for three hours under a pressure of 10,000 p.s.i. Helium was used as the pressure transfer media of the isostatic operation. After isostatic pressing the tubular element was straightened, chemically cleaned, and machined to final size. The resulting cermet is shown in FIGURES 1, 2 and 3, and in actual practice high densities giving the above-mentioned high loadings have actually been obtained.

The process of this invention provides a product superior to previous $UO_2$ stainless steel tubular dispersions because optimum design and materials, and a compactable fabrication process have been combined to yield an ideal or near ideal cermet structure. In this design optimum $UO_2$ particle size (−100+140 mesh) selected fuel loadings (30 to 50 w/o $UO_2$), a stainless steel coated fuel particle (20 to 50 microns thick) and a volatile binder slurry (3.9 w/o binder and 15.2 w/o water) have been utilized to guarantee uniform fuel particle separation and distribution. This composition further lends itself to the production of fuel elements therefrom by slurry extrusion, swage compaction and isostatic pressing.

The extrusion, swaging and isostatic pressing steps of this invention have been carefully selected to effect minimum detrimental changes in design and material properties. This is shown, for example, by the described slurry extrusion step which preforms the coated particles into the rubbery tubular configuration and alleviates problems with the heretofore known cold tube forming operations on densified powder bodies. This slurry extrusion also allows easy forming of heavier fuel loaded cermets than was possible heretofore. Also, minimum cold working has been employed by using swage compaction to size, straighten and pre-densify the tubular extrusion. Additionally, isostatic pressing has been used to effect most of the cermet densification and cermet to clad and dead-end bonding and to obtain maximum use of hot-multidirectional working forces. Additionally, all the described fabrication steps of this invention combine to minimize effects detrimental to high in-pile stability such as fuel fracture, stringering and agglomeration.

In review of the above advantages, this invention provides an ideal or near ideal cermet structure, a capability for higher fuel burnup and longer core life, simpler fuel tube fabrication using an extrusion process, an ability to incorporate higher $UO_2$ fuel loadings in tube shaped elements, a method of obtaining heavier core meat thickness and a minimal fracture and stringering of the fuel particles. Also, this invention avoids the heretofore known complicated processes of powder rolling, forming of flat strips, and seam welding, as well as the agglomeration, fracturing and leakage known heretofore in the products produced thereby.

What is claimed is:

1. A process for directly forming fissile $UO_2$ particles into a tubular shaped high density dispersion having a retaining matrix comprising extruding stainless steel coated spherical $UO_2$ particles with a binder directly to form a tube, heating said tube for removal of said binder and to initiate diffusion bonding of said coatings, swaging said tube for straightening and pre-densification of said particles, adding a stainless steel cladding intimately to said tube, and isostatically pressing said clad tube at high pressure and temperature.

2. A process for directly forming fissile $UO_2$ particles into a high density tubular shaped dispersion having a retaining matrix, comprising extruding stainless steel coated spherical $UO_2$ particles with a volatile binder directly to form a rubbery elastic tube at low temperatures, heating said tube to remove said binder and to initiate diffusion bonding of the stainless steel coating on the particles, swaging said tube whereby it is straightened and the particles are pre-densified, applying a sealed stainless steel cladding intimately to said tube, and isostatically pressing said clad tube at high pressure and temperature for final cermet densification and diffusion bonding of the tube to the cladding.

3. The process of producing a high density dispersion type nuclear fuel element, comprising extruding a water slurry of stainless steel coated spherical $UO_2$ particles with a volatile binder into a rubbery tubular configuration, drying said extruded tube, removing said binder from said extruded tube by volatilization at high temperature, swaging said tube to straighten and pre-densify said tube, assembling said extrusion in a cladding with dead-ends, drawing said assembly through a die, evacuating said assembly, welding the ends of said assembly to seal the evacuation thereof, isostatically pressing said sealed assembly at about 2150° F. and about 10,000 p.s.i. for about three hours finally to densify said $UO_2$ and to diffuse said cladding and said tube, and finishing said pressed assembly to size.

References Cited by the Examiner

UNITED STATES PATENTS

| | | | |
|---|---|---|---|
| 3,011,960 | 12/1961 | Williams et al. | 264—21 |
| 3,032,492 | 5/1962 | Stacy et al. | 176—69 |
| 3,087,876 | 4/1963 | Henderson et al. | 264—21 |
| 3,088,892 | 5/1963 | Cain et al. | 176—69 |
| 3,109,797 | 11/1963 | Maxwell | 176—69 |

CARL D. QUARFORTH, *Primary Examiner.*

R. C. LYNE, A. J. STEINER, *Assistant Examiners.*